United States Patent

[11] 3,608,007

[72] Inventor Bror W. Henrikson
        Grand Rapids, Mich.
[21] Appl. No. 750,310
[22] Filed Aug. 5, 1968
[45] Patented Sept. 21, 1971
[73] Assignee American Seating Company
        Grand Rapids, Mich.

[54] METHOD OF FORMING A RIGID PANEL BY CASTING POLYURETHANE IN A RESIN IMPREGNATED PAPER SHELL
2 Claims, 5 Drawing Figs.

[52] U.S. Cl. .................................................. 264/45,
        161/161, 264/137, 264/259, 264/265
[51] Int. Cl. .................................................. B29d 27/04
[50] Field of Search .......................................... 264/45,
        259; 161/161

[56] References Cited
UNITED STATES PATENTS

| | | | |
|---|---|---|---|
| 2,802,766 | 8/1957 | Leverenze | 264/45 X |
| 2,855,021 | 10/1958 | Hoppe | 264/45 X |
| 2,955,972 | 10/1960 | Wintermute | 264/45 X |
| 3,258,511 | 6/1966 | McGregor | 264/45 X |
| 3,286,004 | 11/1966 | Hill | 264/45 |
| 3,395,059 | 7/1968 | Butler | 264/54 X |
| 3,411,967 | 11/1968 | Rowland | 164/54 UX |
| 3,442,828 | 5/1969 | Engelhardt | 264/45 X |

FOREIGN PATENTS

| | | | |
|---|---|---|---|
| 898,242 | 6/1962 | Great Britain | 264/45 |

*Primary Examiner*—Julius Frome
*Assistant Examiner*—Paul A. Leipold
*Attorney*—Dawson, Tilton, Fallon & Lungmus ABSTRACT: A rigid panel, such as a desk top, is formed by molding and curing phenol-formaldehyde resin-impregnated paper sheets in the form of a hollow shell having depending sidewalls and open on its lower side, filling the interior of the shell with a polyurethane foam body, and curing the foam body to form a rigid porous interior structure, together with a skin reinforcing the shell and closing the open side of the shell. If desired, a sheet may be secured over the open lower side of the shell and the skin of the foam material united with the sheet.

PATENTED SEP 21 1971 3,608,007

INVENTOR
Bror W. Henrikson

BY Dawson, Tilton, Fallon, and Lungmus
ATTORNEYS

METHOD OF FORMING A RIGID PANEL BY CASTING POLYURETHANE IN A RESIN IMPREGNATED PAPER SHELL

BACKGROUND AND SUMMARY

There has long been a need for a means of forming a rigid panel in which the separate parts are relatively weak but when united provide a sturdy rigid structure suitable for desk tops, etc.

I have discovered that resin-impregnated sheets may be formed in the shape of a hollow shell and cured, the shell then becoming reinforced and made solid by the expanding of foam within the shell and the curing of the foam to form the supporting core for the shell. By employing foam material which forms a skin, it is found that the skin combines with the shell enclosure to unify the structure. By providing inserts within the foam material, the finished panel can be readily anchored to desks or other structures.

DRAWING

In the accompanying drawing, FIG. 1 is a perspective view of a desk equipped with a rigid top or panel embodying my invention; FIG. 2, a perspective view of the bottom side of the panel or desk top; FIG. 3, a broken sectional view of the laminated shell in the forming mold, the section being taken as indicated at line 3—3 of FIG. 2; FIG. 4, a view similar to FIG. 3 but showing the formed shell in a mold into which foam material is being placed; and FIG. 5, a broken sectional view of the filled shell in the curing mold.

DETAILED DESCRIPTION

Figure 1:
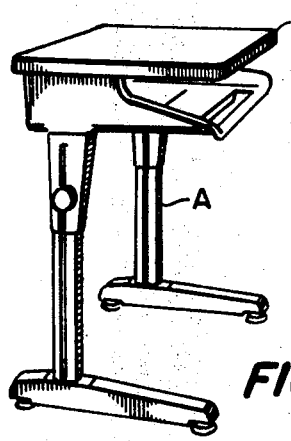
Figure 2:
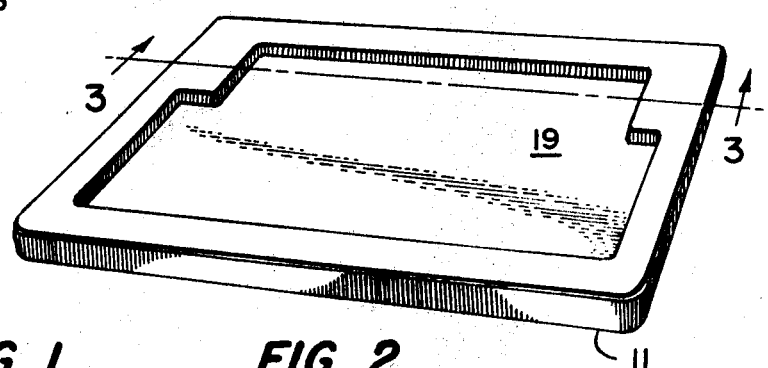

In the illustration given, A designates a desk equipped with a desk top B which is in the form of a rigid panel.

In the preparation of the desk top or rigid panel, I employ a mold 10 into which is placed a laminated shell 11. The laminated shell is made up of sheets of paper or the like impregnated with formaldehyde resin. By way of example, the outermost sheet 12 may be a melamine overlay which forms a transparent coating for the top, and below the melamine layer is a pattern sheet 13, and inwardly of the pattern sheet may be a number of sheets 14 impregnated with a phenolic resin. Since such a laminated body is well known, a further detailed description herein is believed unnecessary.

Figure 3:
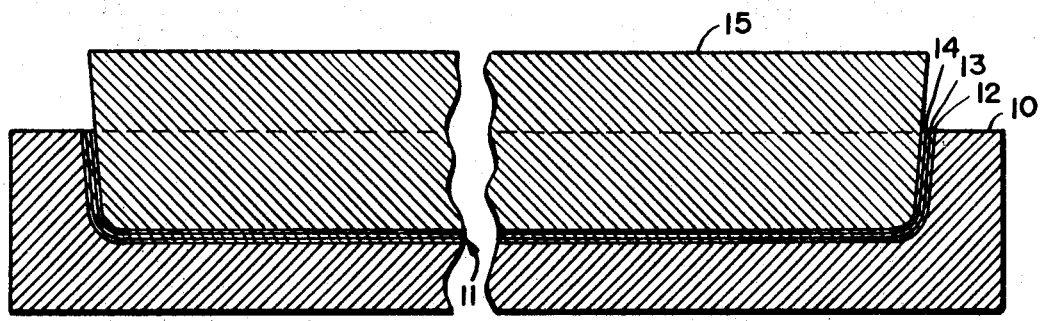

The shell 11 is formed within the mold 10 and the inner mold 15, as illustrated in FIG. 3, and the shell cured so as to provide a bottom portion which is level and forms later the top of the panel and side portions which are extended upwardly in the mold but in the final product extend downwardly, the shell thus being a hollow member being open at one side.

Upon the removal of the mold part 15, the shell 11 may be filled through a nozzle device 16 with a foam material 17. If desired, inserts 18 of wood or metal, etc. may be placed within the shell, as illustrated best in FIG. 4, so as to provide a hard surface for receiving attachment screws.

The foam material may be any suitable porous foam material which may be cured to a solid body, and the foam may be formed by curing reactive materials which foam upon reaction or by mechanically producing a foam, as by pumping in a foam material together with nitrogen, freon, or other gas.

As, by way of example, the foam may be a polyolefine foam material. It may comprise polyether foam, polyester foam, polypropylene foam, polystyrene foam, as well as other well-known foam-forming materials. Further, by way of example, polyurethane prepolymer may be mixed with a catalyst consisting of N-methyl morpholine, water and triethylamine, and the mixture then heated to about 240° F. to complete the reaction.

As stated above, instead of using a gas-producing foam-forming material, latex or other inert material may be introduced with nitrogen or other gas to mechanically produce a foam filling the interior of the shell.

Figure 4:
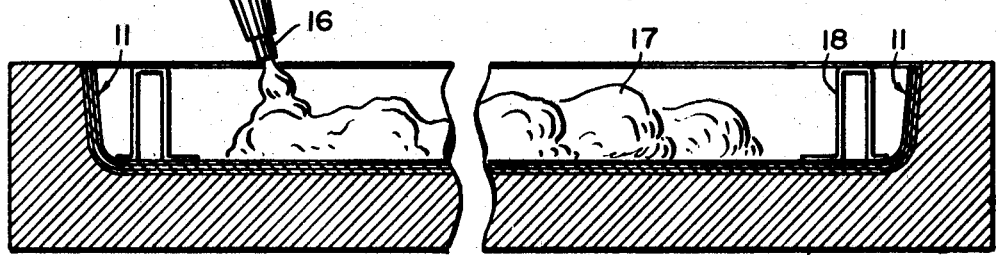

In the illustration given in FIG. 4, the shell 11 is shown filled with polyurethane foam, and over the foam and forming a closure above the foam is a sheet 19 of paper, glassine, or other suitable material forming the undersurface of the finished top. If desired, however, the sheet 19 may be omitted because the foam material itself tends to form a skin and a tough lower surface for the finished top body.

Figure 5:
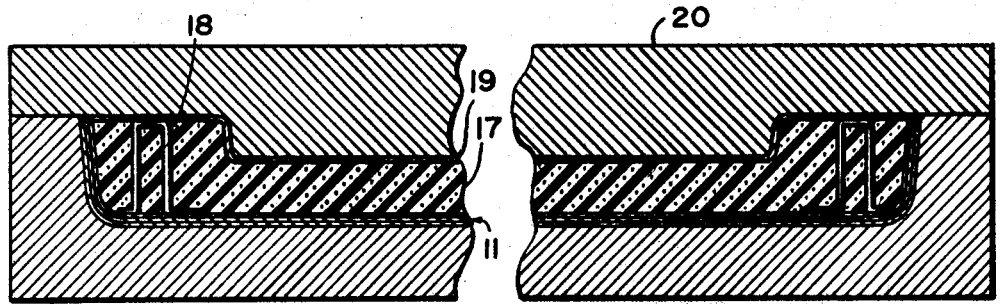

With the parts in the arrangement shown in FIG. 5, an upper mold 20 is placed in position, as shown, so as to close the formed body, and the mold itself may then be placed in an oven to bring about a curing of the foam body and integrate the component parts of the panel.

The finished rigid panel B may be removed from the mold and secured upon the desk, as illustrated in FIG. 1, screws or other fastening means being extended through the desk parts into the members 18 of the top B.

Contributing greatly to the strength and rigidity of the finished top is the property of the foam material in forming a skin which not only becomes integrated with the inner surface of the shell 11 but also unites with the bottom sheet 19. Even when the bottom sheet 19 is omitted, the portion of the foam material adjacent the upper mold 21 becomes densified, forming a skin which provides a smooth finished bottom surface for the desk top.

While the component parts of the rigid panel are relatively weak in character, the shell 11 being flexible and yielding under pressure, the union of the foam material to the shell parts, and particularly the sidewalls of the shell, results in a strong rigid body providing an excellent desk top. Apparently the porous foam material, upon curing, renders the shell structure inflexible and rigid, while at the same time the shell itself provides a tough armor required for the foam material, and the body is unified by the merging of the foam body skin with the shell 11 and with the closure sheet 19.

Specific examples illustrative of the invention may be set out as follows:

EXAMPLE I

A number of paper sheets impregnated with phenol-formaldehyde resin and provided with an outer pattern sheet and a melamine overlay sheet were formed within a mold, as illustrated in FIG. 3, and the shell cured in the form shown at a temperature of about 200° F. Into the shell was introduced through a nozzle from a foam machine, polyurethane prepolymer to which was added 3.6 parts by weight of catalyst per 100 parts of the resin weight, the catalyst consisting of 1.0 part of N-methyl morpholine, 2.3 parts of water, and 0.3 part of triethylamine. The top of the mold was closed with a paper sheet 19, as shown in FIG. 5, and the top mold 20 was clamped in position to seal the mold. The mold was then heated to a temperature of about 240° F. to form the molded body, and thereafter the mold top was removed and secured upon a desk A, as illustrated in FIG. 1 of the drawing.

EXAMPLE II

The process was carried out as described in Example I except that the cover sheet 19 was omitted and polypropylene foam was formed within the body of the mold by injection. Upon curing of the polypropylene, it was found that the foam body formed a skin below the top mold as well as a skin extending about the shell itself and integrated with the shell.

EXAMPLE III

The process was carried out as described in Example I except that polystryrene foam is employed instead of polyurethane foam.

While in the foregoing specification I have set out specific procedural steps in considerable detail for the purpose of illustrating embodiments of the invention, it will be understood that such details may be varied widely by those skilled in the art without departing from the spirit of my invention.

I claim:

1. In a process for forming a closed rigid panel, the steps of impregnating paper sheets with phenol-formaldehyde resin, molding said sheets in a mold into a shell having integral sides and providing a cavity open at its top side, heat curing said shell, introducing skin-forming polyurethane and catalyst foam into said shell, and then heating the said mold to about 240° F. to form a skin integrated with said shell walls.

2. The process of claim 1 in which a closure paper sheet is placed over the open cavity and said mold is heated to unite said skin to said shell walls and said sheet.